Figure 5:
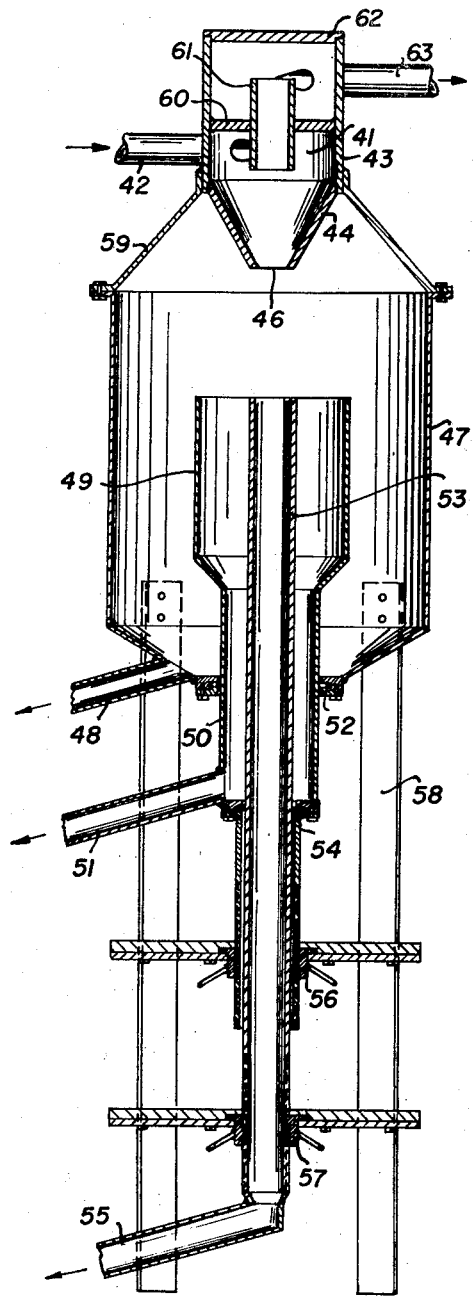

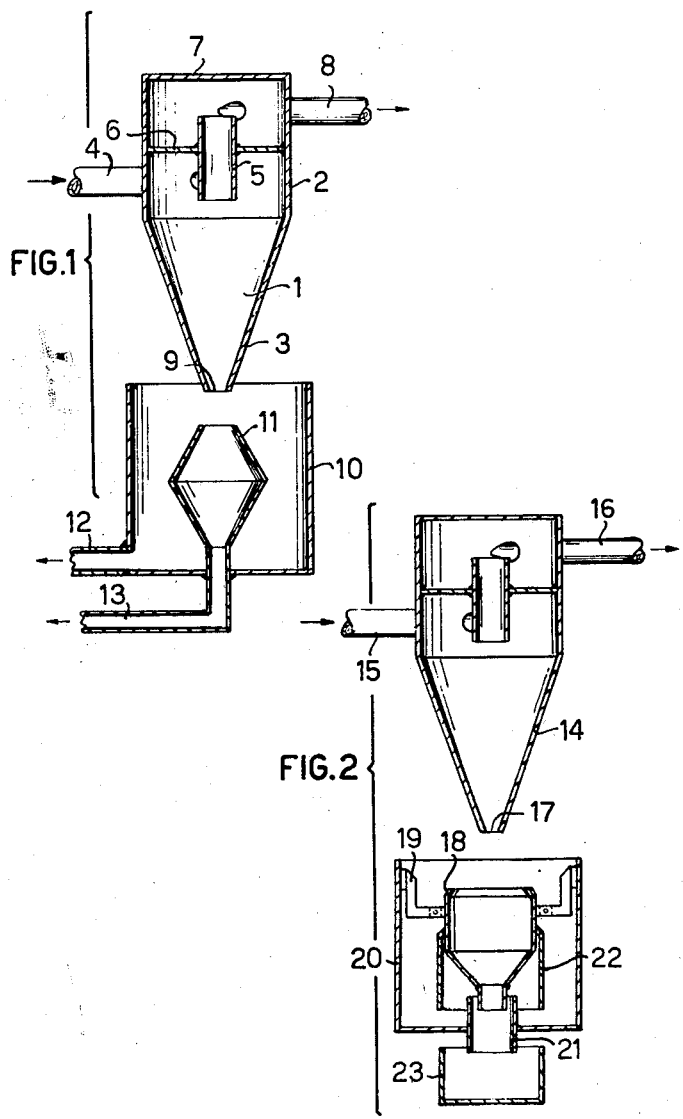

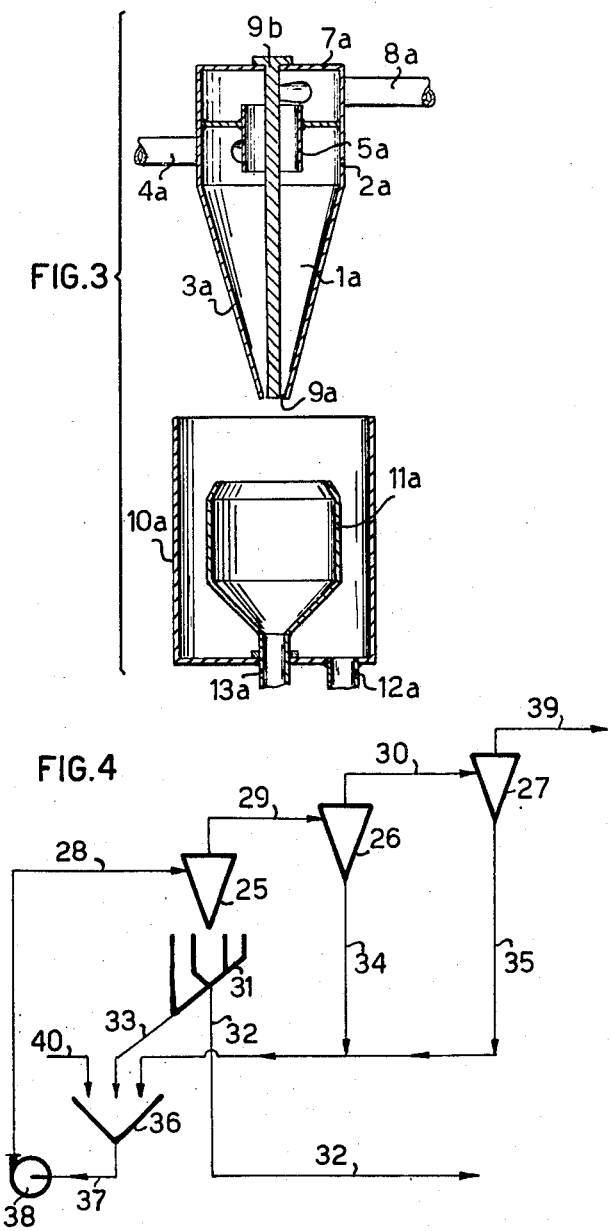

United States Patent Office 2,781,910
Patented Feb. 19, 1957

2,781,910

PROCESS OF THICKENING SUSPENSIONS OR EMULSIONS

Freerk J. Fontein, Heerlen, Netherlands, assignor to Stamicarbon N. V., Heerlen, Netherlands Application May 8, 1953, Serial No. 353,837

Claims priority, application Netherlands November 30, 1951

7 Claims. (Cl. 210—51)

My invention relates to a process of thickening suspensions or emulsions, hereinafter and in the claims hereof referred to as liquid dispersions, and obtaining a product having a predetermined concentration of dispersed matter.

It has already been proposed to employ a so-called hydrocyclone for thickening suspensions. In practice it has appeared that the concentration of suspended matter in the hydrocyclone discharge depends to a certain extent on the concentration of the feed. As a result a suspension of a definite concentration cannot be obtained if the concentration of suspended particles in the feed varies considerably.

Now it is an object of my invention to provide a process of thickening suspensions, or other liquid dispersions, by means of a hydrocyclone in which process, irrespective as to variations in the concentration of dispersed matter in the feed, a thickened dispersion is obtained with a concentration of dispersed matter equal to or greater than a certain predetermined concentration.

It is a further object of my invention to provide a thickening process as abovementioned wherein a thickened dispersion is obtained with a concentration of dispersed matter which lies within the range of certain predetermined minimum and maximum concentrations.

Further objects of my invention will appear hereinafter.

In my co-pending application No. 314,556, filed October 13, 1952, I have described and claimed apparatus for causing a liquid to flow along different conduits depending on the viscosity of said liquid, which apparatus comprises a rotation chamber, i. e., a chamber peripherally bounded by a closed surface of revolution and having a centrally disposed circular discharge aperture and one or more feed passages and constructed so that if a liquid is fed thereinto under sufficient pressure it will start rotating on a radius which is greater than that of said discharge aperture and a liquid vortex is produced, the liquid leaving the chamber through the central discharge aperture as a rapidly rotating jet having the form of a hollow cone the angle of which at a constant pressure drop over the vortex and with liquid within a certain viscosity range, is a measure of the viscosity of the discharging liquid. In addition to the rotation chamber, the said apparatus comprises at least one discharge-receiving pipe or vessel with a mouth which faces the discharge aperture of the rotation chamber with the edge of such mouth intersected by the boundary of an imaginary straight cone passing through the edge of the discharge aperture and co-axial therewith, so that in use, discharge through or outside the said mouth depends upon the viscosity of the discharging liquid. Apparatus comprising two or more discharge-receiving pipes or vessels of the above-mentioned character may be used for collecting liquid in one or more fractions each having a viscosity between predetermined limits.

My abovementioned application also describes and claims apparatus wherein an increase of the variation range of the angle of the discharge cone has been obtained by inserting into the rotation chamber's discharge aperture a solid core of circular cross section and being located co-axially with the rotation chamber.

Furthermore my abovementioned application describes and claims a process for causing a liquid to flow along different conduits depending on the viscosity of the liquid, by means of the said apparatus and also describes and claims a process using the said apparatus, for regulating the viscosity of a liquid obtained as the product of a physical or chemical process by which the viscosity of said product is affected, while the liquid not coming up to the requirements is recycled in order to be exposed once more, in whole or in part, to the process concerned.

If now a liquid dispersion subjected to thickening comprises a liquid containing dispersed particles the mean size of which remains practically constant, there is a simple relation between the concentration of the dispersed matter and the viscosity of the said dispersion and the abovementioned apparatus is therefore suitable for regulating the composition of the specific gravity of liquid dispersions. In my said co-pending application I have described as a particular application of the abovementioned process and apparatus, a case in which a suspension is thickened in hydrocyclones and the thickened discharge fraction leaving the hydrocyclones is forced through a rotation chamber positioned with its axis substantially vertical, under which chamber two or more discharge-receiving vessels are arranged as before described, the apparatus being so regulated that at each of the desired limit values of the concentration of the suspension discharging from the rotation chamber, the boundary surface of the discharge cone from the chamber just touches the edge of the mouth of one of the receiving pipes or vessels. If it is desired that the suspension has a certain minimum specific gravity (or viscosity), the material having too low a specific gravity may be recycled. If a certain maximum specific gravity is required, the suspension thickened too much may be recycled after it has been diluted. In these cases, two discharge-receiving vessels will suffice. If a specific gravity (or viscosity) between a certain minimum and a certain maximum value is desired, three such vessels will be necessary. In the latter case, the suspension having the desired concentration is received by the medial vessel, the suspension of too high a concentration entering the inner vessel, and the suspension of too low a concentration entering the outer vessel. Suspensions not having the desired concentration may be recycled or processed in another way, if necessary after being subjected to a preliminary treatment.

Now I have found that where a hydrocyclone or a number of hydrocyclones arranged in series is (are) used for thickening a suspension or another liquid dispersion, the hydrocyclone or one of the hydrocyclones may itself perform the function of said rotation chamber. In this case the discharge collecting device hereinbefore referred to may be mounted immediately under the apex discharge aperture of said hydrocyclone. Thus a very simple process is obtained, by means of which, e. g., a liquid dispersion with at least a certain minimum viscosity or minimum concentration of dispersed matter or with at least a certain minimum specific gravity can be obtained irrespective as to variations of the concentration of dispersed particles in the feed.

This possibility results from the fact that the angle of the discharge cone from the said discharge aperture of a hydrocyclone is not directly determined by the viscosity of the feed, but by the viscosity of the discharging liquid dispersion.

It is of course essential that in the practical concentration range the angle of the discharge cone is considerably dependent on concentration changes in the discharging liquid. In so far at least as the thickening action is not affected thereby, suitable dimensions of the hydrocyclone may be chosen for that purpose.

In use it is practicable to employ at least two discharge-receiving pipes or vessels, the outer of said vessels having a mouth of sufficient size to receive all liquid discharging outside the next inner pipe or vessel. Such an outer vessel for functioning in this way, need, of course, not have a mouth of the abovementioned character. Thus, apparatus comprising, e. g. as a unit, a hydrocyclone and a single discharge-receiving pipe or vessel in accordance with my invention, may be operated with said unit located within or in other suitable relation to a second discharge-receiving pipe or vessel, e. g., a tank, for receiving the liquid discharging outside the pipe or vessel forming part of the unit aforesaid.

Naturally, it is not necessary that the operation of the hydrocyclone should be restricted to thickening. A classifying or washing (i. e., specific gravity separation) process may take place in the hydrocyclone at the same time.

The term "hydrocyclone" as used in this specification and the claims hereof refers to apparatus comprising a chamber peripherally bounded by a closed surface of revolution and having a feed inlet or inlets and opposed axial discharge apertures through which material discharges in two fractions, one from the inner "layers" and the other from the outer "layers" of a rotating body of liquid material when this is set up in the chamber to form inner and outer vortices by feeding the material into the chamber through its inlet(s) under a suitable pressure.

Such hydrocyclones, examples of which will hereafter be described with reference to the drawings accompanying this specification, are well-known per se as apparatus in which thickening, classifying and other operations can be performed.

Also in apparatus used according to my present invention a considerable increase of the variation range of the angle of the apex discharge cone can be obtained by inserting into the apex discharge aperture of the hydrocyclone a solid core with a circular cross section which core is located co-axially with the hydrocyclone. Said core can be fixed or revolvable about its axis of symmetry. It can be attached either within the hydrocyclone or to the inner discharge-receiving vessel. It is important, however, that the attachment means of the solid core do not interfere either with the liquid current within the hydrocyclone or in the apex discharge cone.

By the presence of said solid core the apex discharge aperture is changed into an annular slot and the diameter of the core is so chosen as to have filled said slot with discharging liquid under all practical circumstances.

It stands to reason that the thickening action of the hydrocyclone is influenced by the presence of said solid core in the apex discharge aperture. This influence must be counteracted either by exerting a counterpressure on the overflow discharge or by widening the apex discharge aperture in such a manner that the resistance of the annular slot is the same as that of a usable unobstructed discharge aperture.

In summary it can be said that my invention relates to a process of thickening a liquid dispersion and thereby obtaining a product having at least a predetermined minimum concentration of dispersed matter or having a concentration of dispersed matter within the range of predetermined minimum and maximum concentrations which process consists in forcing the liquid dispersion through a hydrocyclone adapted to thicken the liquid dispersion and so proportioned and dimensioned as to deliver through its apex aperture a thickened dispersion which over a critical range of concentrations of dispersed matter, including said predetermined concentrations, has the form of a hollow discharge cone, and as to cause the apex angle of said discharge cone to vary considerably with concentration over said critical concentration range; collecting the discharge in a discharge-receiving device positioned opposite said apex aperture, said device comprising two or three vessels provided with discharge conduits, said vessels being at least at their discharge-receiving ends positioned within each other, the outer one being proportioned and mounted so as to receive all liquid that can be discharged from the apex aperture of the hydrocyclone, the other vessels having discharge-receiving mouths of such a form and so positioned that a discharge cone of the liquid dispersion having any predetermined concentration as abovementioned just touches the edge of the mouth of one of said other vessels; and recycling any discharged liquid dispersion not having a required concentration, if necessary after having been diluted.

My invention will be further explained with the help of the accompanying drawings which illustrate by way of example only apparatus to be used preferably in the process according to my invention.

Figures 1, 2 and 3 of the drawings represent vertical sections of apparatus to be used in the process according to my invention and Figure 4 is a diagram of a thickening plant wherein my invention is put into practice. Figure 5 is another form of apparatus for separating a suspension having a concentration of dispersed matter between predetermined limits.

Figure 1 represents a hydrocyclone 1 for thickening suspensions, which hydrocyclone consists of a cylindrical section 2 and a conical section 3. A tangentially directed feed conduit 4 debouches into the cylindrical section. The axial discharge aperture in the wide end of the hydrocyclone through which clarified liquid is to be discharged, is defined by a short length of pipe 5, known as a "vortex finder," which passes through the end wall 6 of the chamber and extends into the discharge hood 7 which is provided with a discharge tube 8 for the said liquid. If a liquid dispersion is forced under pressure into the hydrocyclone via the feed conduit 4, the liquid which is set in rapid rotation in the chamber with the rotary current increasing in angular velocity from the periphery of the chamber inwards forms inner and outer vortices the former moving axially towards and through the vortex finder 5 and the outer vortex moving in the other direction towards and through the apex discharge aperture 9. This action has a thickening effect. The liquid, to a large extent freed of dispersed particles, leaves the hydrocyclone through the vortex finder 5 and is removed via the hood 7 and the discharge conduit 8. The thickened dispersion leaves the hydrocyclone through the discharge aperture 9, as a rotating liquid jet, forming a hollow discharge cone outside the discharge aperture.

Under the discharge aperture 9 a collecting device is provided, consisting of a discharge-receiving vessel 10 in which a vessel 11 peripherally bounded by a continuous surface of revolution, is arranged co-axial with the hydrocyclone. The vessels are provided with discharge pipes 12 and 13 respectively.

The angle of the apex discharge cone formed by the thickened dispersion depends on the viscosity and hence on the specific gravity or the concentration of dispersed matter of the discharging thickened dispersion. If the concentration of dispersed matter is higher than that which gives a discharge cone the boundary surface of which just touches the edge of the mouth of vessel 11, the liquid is caught in the vessel 11 and discharged through the pipe 13. If the concentration is lower, the thickened dispersion spouts into the vessel 10 and is discharged through the pipe 12; if desired the liquid leaving vessel 10 may be recycled.

With processes, in which several cyclone thickeners are arranged in parallel, for instance of thickening carrier suspensions in coal or ore washeries, it may be advantageous to remove the resulting products via troughs.

Figure 2 represents an apparatus which is particularly suited to this end. It gives a picture of one of the hydrocyclones 14, provided with a tangentially directed feed conduit 15, a discharge conduit 16 for the fraction discharging at the wide end and an apex discharge aperture 17.

Under the discharge aperture 17 and co-axial with the hydrocyclone 14 the vessel 18 is mounted in the discharge trough 20 by means of the brackets 19.

A pipe 21 extends through the bottom of the discharge trough 20, in such a way that the liquid from the vessel 18 can be conveyed through this pipe into another trough 23 situated beneath the trough 20. In order to avoid splashing, a cylindrical splash-guard 22 may be attached to the vessel 18. The distance from the plane of the discharge aperture 17 to the edge of the vessel 18 may be made adjustable (not shown in the drawing) in order to change the concentration value below which a discharge will take place into the trough 20. A number of hydrocyclones may be mounted over the discharge troughs 20 and 23 in the manner illustrated in the figure. If a diluted suspension is forced through the tangential feed conduit 15 and the adjustment of the hydrocyclone is correct a liquid that is practically free of suspended particles is discharged through the discharge conduit 16; the suspension flowing off through the trough 23 then has a specific gravity higher than a certain predetermined minimum value while the specific gravity of the thickened suspension leaving through the trough 20 is not yet high enough. This latter suspension has to be recycled.

If mixtures of sand and loess having different specific gravities are forced at 2 atm. gauge pressure through a hydrocyclone as represented in Figure 2 and having the following dimensions:

Internal diameter of cylindrical section_____mm__ 350
Internal diameter of tangential feed pipe_____mm__ 50
Internal diameter of vortex finder_____mm__ 50
Internal diameter of discharge aperture_____mm__ 20
Half apex angle_____degrees__ 10 the following values for the specific gravity of the apex discharge fraction are obtained with the different feed concentrations stated:

Specific gravity of feed:   Specific gravity of apex fraction
1.089_____ 1.694
1.105_____ 1.767
1.115_____ 1.795
1.134_____ 1.829

The angle of the apex discharge cone varied from 104° to 60°. If under the apex discharge aperture a collecting device is placed as illustrated in Figure 2, in such a manner that a liquid discharge cone having an apex angle of 60° just touches the edge of the mouth of the inner receiving vessel 18, a suspension with a minimum specific gravity of 1.83 can be discharged through the trough 23. The liquid discharged into the trough 20 is then recycled.

Figure 3 represents an apparatus with a solid core in the apex discharge aperture of the hydrocyclone. The hydrocyclone 1a consists of a cylindrical section 2a and a conical section 3a and is provided with a tangentially directed feed conduit 4a, a vortex finder 5a and an apex discharge aperture 9a. A solid cylindrical core 9b which is attached to the upper wall of the overflow discharge hood 7a extends axially within the hydrocyclone through the vortex finder 5a and into the apex discharge aperture 9a. If the liquid dispersion to be thickened is forced under pressure through the feed conduit 4a, clarified liquid leaves the hydrocyclone through vortex finder 5a, hood 7a and discharge conduit 8a. The thickened dispersion leaves the hydrocyclone through the annular slot which is formed by the apex discharge aperture 9a and the solid core 9b as a hollow liquid discharge cone.

The discharge collecting device consists of a discharge-receiving vessel 10a with a discharge conduit 12a and a second vessel 11a, peripherally bounded by a continuous surface of revolution and arranged co-axial with the hydrocyclone, which is provided with a discharge conduit 13a. The action of the discharge collecting device is the same as described in connection with Figure 1. A sharper separation of the thickened dispersion fractions can be obtained, however, as a consequence of the greater variation of the apex discharge cone angle with concentration variations of the thickened dispersion.

Figure 4 is a simple diagram of a thickening plant in which hydrocyclones arranged in series are employed while use is made of recirculation. The liquid dispersion to be thickened is supplied through the pipe 40 and fed to the pump 38 via the pump reservoir 36 and the feed conduit 37, said pump conveying the liquid, via the pipe 28, tangentially into the first cyclone thickener 25 of a set of three hydrocyclones 25, 26 and 27 arranged in series. Via the pipe 29 the overflow fraction from 25 is fed tangentially into the hydrocyclone 26, the overflow issuing from this hydrocyclone being fed tangentially into the hydrocyclone 27 via the pipe 30. In the first hydrocyclone 25 the greater part of the dispersed particles is separated and removed as a thickened dispersion through the discharge aperture of this hydrocyclone. If the concentration of dispersed matter and hence the viscosity is sufficiently high the thickened dispersion is caught in the innermost vessel of the collecting device 31 and discharged through the pipe 32 as the final product.

If the concentration and hence the viscosity is too low, the dispersion is caught in the outermost vessel of the collecting device 31 and returned to the pump reservoir 36 via the pipe 33. As a result hereof the concentration of the dispersed matter in the pump reservoir rises, which causes an increase in the concentration of the apex discharge from the hydrocyclone 25. This is continued until the concentration and hence the viscosity has become so high and the angle of the apex discharge cone consequently so small that the thickened dispersion is again discharged through the pipe 32.

The overflow fraction from hydrocyclone 25, which contains but little dispersed matter, is subsequently subjected to further treatment in the hydrocyclones 26 and 27, so that a liquid that is substantially freed of dispersed particles is removed through the pipe 39. The apex discharge fractions from these hydrocyclones, consisting of dispersions more or less thickened, are returned to the pump reservoir 36 via the pipes 34 and 35 respectively.

In order to make it possible to regulate the predetermined concentrations at which the direction of the material discharging from the apex aperture of a given hydrocyclone is to be effected along one conduit or another, the apparatus to be used with the process according to my invention is preferably constructed so that the distance from the apex discharge aperture of the said hydrocyclone to the mouths of the collecting vessels is adjustable, for instance in the manner described in my co-pending patent application No. 314,556 hereinbefore mentioned.

In some processes, for instance if the thickening of a liquid dispersion is carried out for the purpose of regeneration, e. g., as may be necessary for a diluted carrier suspension in a coal or ore washery, it may be important to avoid too high a concentration of the dispersion. In this case a collecting device may be placed under the apex discharge aperture of the first hydrocyclone thickener, which device consists of three vessels as described in my aforesaid co-pending patent application so that a dispersion within a concentration range between two predetermined limits is caught in the medial vessel. Thereby it is possible to catch in the inner vessel, separately any dispersion which has been too highly concentrated, and to regenerate this by way of dilution to a dispersion of the right specific gravity.

Figure 5 is a cross-sectional view of an apparatus which is capable of yielding a suspension whose viscosity is intermediate between a certain minimum and a certain maximum value. The apparatus comprises a hydrocyclone 41 which is composed of a cylindrical portion 43 covered by a plate 60 and a conical portion 44. A tangentially directed feed pipe 42 opens into the cylindrical portion 43.

The hydrocyclone 41 is provided with a vortex finder 61 for the discharge of the clarified liquid, which vortex finder passes through the cover plate 60 and discharges into the discharge hood 62 which is provided with a discharge tube 63 for the clarified liquid. The discharge aperture 46 is provided for the thickened suspension.

With the help of a few supporting members 59, the hydrocyclone is mounted on a reservoir 47 which is mounted on the frame 58 and is provided with an outlet 48. In the bottom of said reservoir 47 there is an aperture admitting a cylindrical collecting vessel 50 rising into a widened part 49 and provided at the lower end with a delivery pipe 51. Mounted inside said collecting vessel 50 is a central pipe 53 which at its lower end connects with a discharge pipe 55. The lower ends of the collecting vessels 50 and 53 are connected to screw adjustments 56 and 57, respectively. The nuts of said screw adjustments are so mounted in the frame 58 as to enable them to be rotated therein. Thus it is possible to raise or lower the collecting vessels 49 and 53 with respect to the vessel 47 and the pipe 50 respectively through the guides 52 and 54 respectively.

If at a constant pressure a suspension to be thickened is forced into the hydrocyclone 41 through the tangential feed pipe 42, the thickened suspension will be discharged from the aperture 46 in the form of a straight jet or in the form of a sheet or film in the shape of a hollow cone diverging more or less depending on its viscosity. A suspension with a viscosity higher than a certain maximum viscosity will be collected in the pipe 53 and be discharged through the pipe 55, whereas a suspension having a viscosity lower than a certain minimum viscosity will be directed across the edge of vessel 49 and be collected in the vessel 47 and be discharged through pipe 48. If the viscosity of the thickened suspension is intermediate between the aforesaid maximum and minimum viscosities, it will be collected in vessel 49 and be discharged through pipe 51. By raising the collecting vessel 49 or 53 with the aid of the adjusting screw 56 or 57 respectively, the lower and higher limit respectively of the viscosity of the suspension discharged through pipe 51 may be lowered. In reverse, said viscosity limits may be raised by lowering said vessels.

Depending on the purpose for which the thickening of the suspension is performed, the thickened suspension may be treated in various ways. If it is desired to deliver a suspension having a viscosity which is intermediate between a certain minimum and a certain maximum value, the adjustment of the apparatus may be so selected that such suspension is delivered through the pipe 51. The suspensions discharged through the pipes 48 or 55 may then be returned into the process concerned or be used for other purposes. In a process which is to yield a suspension of a certain minimum viscosity, such suspension may be discharged through the pipe 55. In that case the pipes 51 and 48 will yield suspensions of different but too low a viscosity. These suspensions may advantageously be resupplied to the process concerned at various stages thereof, e. g., the suspension discharged through pipe 51 having the higher viscosity somewhere in the middle, and the suspension discharged through pipe 48 having the higher viscosity somewhere in the initial stage of such process.

I claim:

1. A process of thickening a liquid dispersion to obtain a product having a minimum concentration of dispersed matter therein comprising the steps of continuously feeding said dispersion under pressure tangentially into a radially symmetrical space to establish concentric inner and outer liquid vortices moving in opposite axial directions therein, discharging clarified liquid from said inner vortex from one axial end of said space, discharging thickened liquid dispersion from said outer vortex from the other axial end of said space in the form of a hollow diverging cone, and separately receiving thickened liquid dispersion discharged from said space in the form of a hollow cone of apex angle less than a fixed limit.

2. A process of thickening a liquid dispersion to obtain a product having a minimum concentration of dispersed matter therein comprising the steps of continuously feeding said dispersion under pressure tangentially into a radially symmetrical space to establish concentric inner and outer liquid vortices moving in opposite axial directions therein, discharging clarified liquid from said inner vortex from one axial end of said space, discharging thickened liquid dispersion from said outer vortex from the other axial end of said space in the form of a hollow diverging cone, separately receiving thickened liquid dispersion discharged from said space in the form of a hollow cone of apex angle less than a fixed limit, and separately receiving thickened liquid dispersion discharged from said space in the form of a hollow cone of apex angle exceeding said fixed limit.

3. A process of thickening a liquid dispersion to obtain a product having a concentration of dispersed matter therein within a fixed range comprising the steps of continuously feeding said dispersion under pressure tangentially into a radially symmetrical space to establish concentric inner and outer liquid vortices moving in opposite axial directions therein, discharging clarified liquid from said inner vortex from one axial end of said space, discharging thickened liquid dispersion from said outer vortex from the other axial end of said space in the form of a hollow diverging cone, and separately receiving thickened liquid dispersion discharged from said space in the form of a hollow cone of apex angle within a fixed range.

4. A process of thickening a liquid dispersion to obtain a product having a concentration of dispersed matter therein within a fixed range comprising the steps of continuously feeding said dispersion under pressure tangentially into a radially symmetrical space to establish concentric inner and outer liquid vortices moving in opposite axial directions therein, discharging clarified liquid from said inner vortex from one axial end of said space, discharging thickened liquid dispersion from said outer vortex from the other axial end of said space in the form of a hollow diverging cone, separately receiving thickened liquid dispersion discharged from said space in the form of a hollow cone of apex angle within a fixed range, and separately receiving liquid dispersion discharged from said space in the form of a hollow cone of apex angle exceeding said range.

5. A process according to claim 4, including the steps of separately receiving thickened liquid dispersion discharged from said space in the form of a hollow cone of apex angle less than said range, diluting such separately received liquid product portion, and re-cycling the diluted liquid product portion into the process.

6. A process of thickening a liquid dispersion to obtain a product having a minimum concentration of dispersed matter therein comprising the steps of continuously feeding said dispersion under pressure tangentially into a radially symmetrical space to establish concentric inner and outer liquid vortices moving in opposite axial directions therein, discharging clarified liquid from said inner vortex from one axial end of said space, discharging thickened liquid dispersion from said outer vortex from the other axial end of said space through an annular discharge aperture in the form of a hollow diverging cone, and separately receiving thickened liquid dispersion passing inside an annular discharge intercepting edge of greater diameter than said discharge aperture, axially spaced from and axially aligned with said discharge aperture.

7. Apparatus for thickening a liquid dispersion to obtain a product having a minimum concentration of dispersed matter therein comprising a closed radially symmetrical chamber, circular axial discharge apertures in both ends of said chamber, a feed passage discharging into said chamber on a radius exceeding that of said discharge apertures, whereby concentric inner and outer liquid vortices moving in opposite axial directions may be established in said chamber, the inner vortex discharging through one of said discharge apertures and the outer vortex discharging from the other of said apertures in the form of a hollow diverging cone, a cylindrical core member of smaller diameter than said other discharge aperture disposed coaxially within said other discharge aperture, a discharge receiving device positioned opposite said other discharge aperture, said device including an annular discharge intercepting edge of greater diameter than said other discharge aperture, axially spaced from and axially aligned with said other discharge aperture, and means for separately receiving thickened liquid dispersion discharged from said other discharge aperture and passing inside said discharge intercepting edge.

References Cited in the file of this patent

UNITED STATES PATENTS

| | | |
|---|---|---|
| 1,103,812 | Steinmann | May 1, 1924 |
| 1,825,157 | Pardee | Sept. 29, 1931 |
| 1,908,691 | Coe | May 16, 1933 |
| 1,973,607 | Bunn | Sept. 11, 1934 |
| 2,179,919 | Carr et al. | Nov. 14, 1939 |
| 2,346,005 | Bryson | Apr. 4, 1944 |
| 2,422,464 | Bartholomew | June 17, 1947 |
| 2,538,870 | Hunter | Jan. 23, 1951 |

FOREIGN PATENTS

| | | |
|---|---|---|
| 5,648 | Great Britain | 1912 |